United States Patent
Baude

(10) Patent No.: US 7,938,618 B2
(45) Date of Patent: May 10, 2011

(54) DEVICE FOR SILENCING A HELICOPTER GAS TURBINE ENGINE AND ENGINE THUS OBTAINED

(75) Inventor: Pierre Michel Baude, Nay (FR)

(73) Assignee: Turbomeca, Bordes (FR)

( * ) Notice: Subject to any disclaimer, the term of this patent is extended or adjusted under 35 U.S.C. 154(b) by 871 days.

(21) Appl. No.: 11/854,915

(22) Filed: Sep. 13, 2007

(65) Prior Publication Data
US 2008/0185217 A1 Aug. 7, 2008

(30) Foreign Application Priority Data
Sep. 20, 2006 (FR) ..................... 06 53835

(51) Int. Cl.
*F04D 29/66* (2006.01)
(52) U.S. Cl. ....................... 415/119; 415/205
(58) Field of Classification Search .............. 415/119, 415/205; 244/1 N; 181/213, 214, 220
See application file for complete search history.

(56) References Cited

U.S. PATENT DOCUMENTS

| 2,943,683 | A | * | 7/1960 | Dirksen | 166/106 |
| 3,077,731 | A | * | 2/1963 | Addie et al. | 60/599 |
| 3,166,237 | A | * | 1/1965 | Hill | 417/365 |
| 3,371,471 | A | | 3/1968 | Connors | |
| 3,449,891 | A | | 6/1969 | Shohet et al. | |
| 4,204,586 | A | * | 5/1980 | Hani et al. | 181/229 |
| 4,421,455 | A | | 12/1983 | Tomren | |

FOREIGN PATENT DOCUMENTS

| CN | 1191427 C | 3/2005 |
| FR | 2 210 724 | 7/1974 |
| FR | 2 250 671 | 6/1975 |
| WO | WO 01/50000 A1 | 7/2001 |

OTHER PUBLICATIONS

U.S. Appl. No. 11/854,907, filed Sep. 13, 2007, Baude, et al.

\* cited by examiner

*Primary Examiner* — Ninh H Nguyen
(74) *Attorney, Agent, or Firm* — Oblon, Spivak, McClelland, Maier & Neustadt, L.L.P.

(57) ABSTRACT

In a helicopter gas turbine engine, lips (30, 32) defining a radial air intake (34) are connected along an opening (12*a*) of an engine compressor air supply passage (12). The air intake lips are at least partially formed by a sound attenuator (40, 42) calculated to attenuate sound frequencies produced by the compressor rotation.

5 Claims, 2 Drawing Sheets

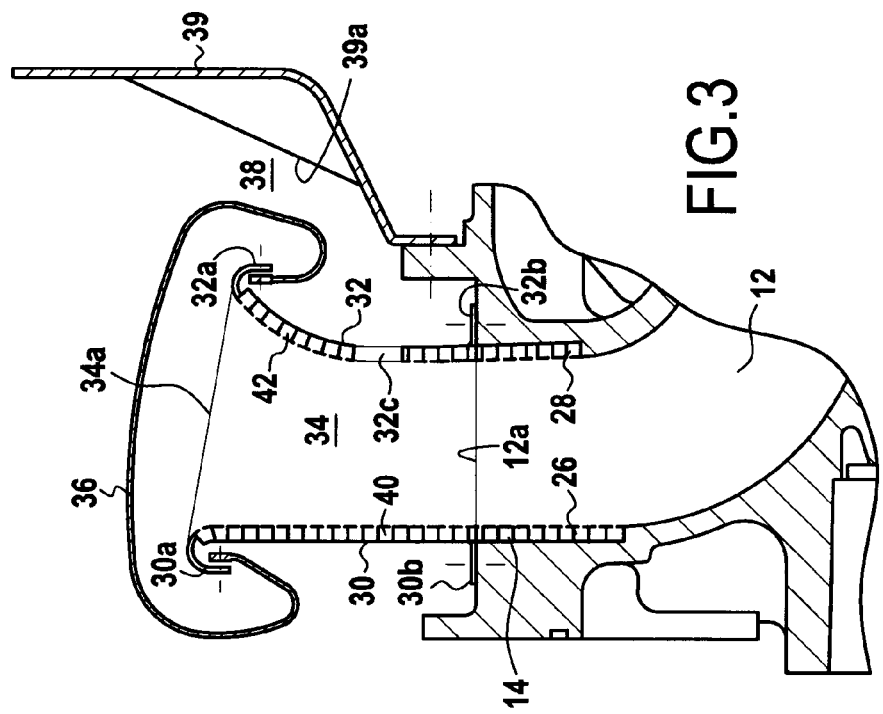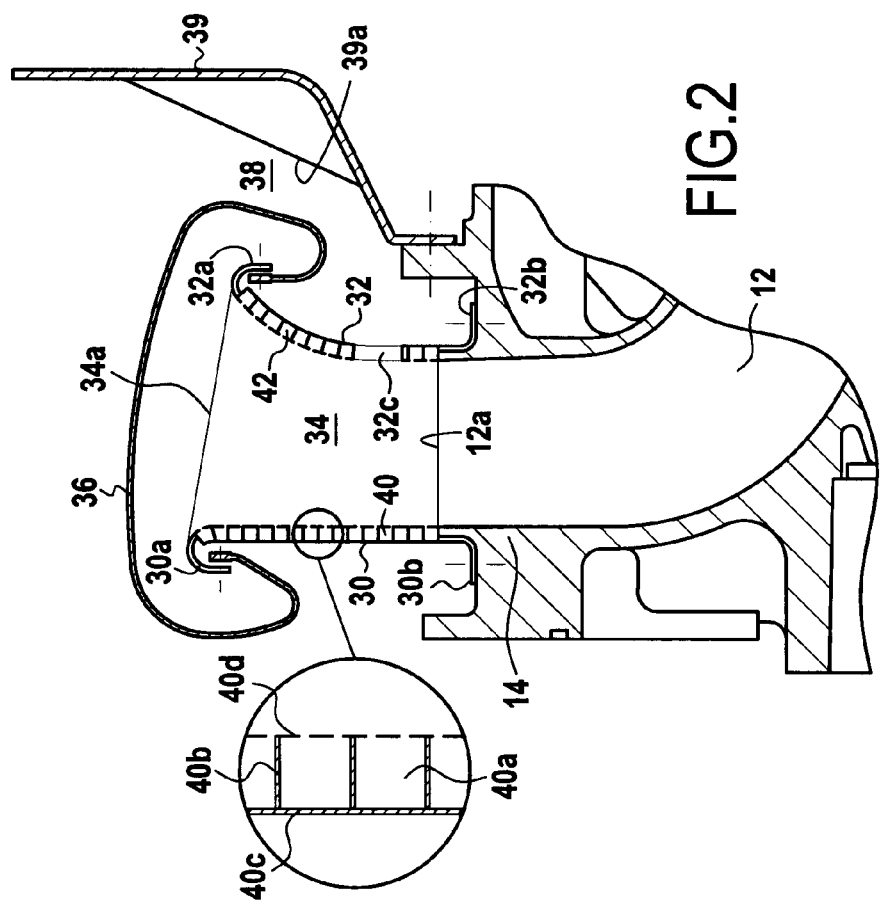

DEVICE FOR SILENCING A HELICOPTER GAS TURBINE ENGINE AND ENGINE THUS OBTAINED

BACKGROUND TO THE INVENTION

This invention relates to the reduction in the sound level of gas turbine engined helicopters.

Efforts have been made to reduce the noise caused by helicopter main rotor blades, with the result that the noise generated by the blade drive engine can now form a significant proportion of the sound level of a gas turbine engined helicopter.

Document U.S. Pat. No. 4,421,455 discloses a gas turbine engine, in particular for an APU (Auxiliary Power Unit), in which coatings forming sound attenuators are integrated at certain locations of metallic casing walls defining an air supply passage for a compressor of the engine. The thickness of the coatings means a substantial required volume affecting the dimensioning of the engine. In addition, the engine, in particular the metallic casing, has to be designed originally to allow the housing of the sound attenuators.

OBJECT AND SUMMARY OF THE INVENTION

An object of the invention is to provide a silencing device for a helicopter having no such drawbacks.

This object is achieved with a device for silencing a helicopter gas turbine engine having a compressor and a compressor air supply passage opening at an upstream end through an outer opening delimited by a metallic casing of the engine, the silencing device comprising air intake lips which define an air intake for the compressor air supply passage, which have inner ends for connection to the metallic casing along the passage outer opening and which are at least partially formed by a sound attenuator calculated to attenuate sound frequencies produced by the compressor rotation.

The silencing treatment according to the invention has several advantages. Its location not far from the compressor, the engine's principal source of noise, gives it good efficiency. Also, the air intake lips being located on the outer side of the engine by being mounted on the metallic casing, the provision of a sound attenuator does not create any problem of bulkiness and does not necessitate revising the engine design; the silencing treatment, or hush kitting, is easily applicable to existing engines. Furthermore, lips with a sound attenuator can be made of a light material such as a composite material of the fibre-resin type so that the addition of the sound attenuator does not involve a great increase in mass. What is more, with this arrangement, it is still possible to cover the radial air intake with an iceguard.

It will also be noted that, with effective attenuation of the noise caused by the rotation of the blades, the latter can be designed with the aim of optimizing aerodynamic behaviour, without the need to deal with the consequences relating to sound.

According to a particular embodiment, the silencing device also comprises a sound attenuator forming a wall of the compressor air supply passage on a portion of the length of the passage starting from the outer opening thereof.

The sound attenuation can be, for example, a wall covering of the Helmholtz resonator type or of any other known type.

BRIEF DESCRIPTION OF THE DRAWINGS

The invention will be understood better when the description given below, for guidance but without limitation, is read with reference to the appended drawings in which:

FIG. 2 is an enlarged half-section partial view showing the integration of a sound attenuator in the lips of the radial air intake for the compressor of the engine in FIG. 1 and FIG. 3 is an enlarged half-section partial view showing the integration of sound attenuators in the lips of the radial air intake and in the air supply passage case of the compressor in FIG. 1.

DETAILED DESCRIPTION OF EMBODIMENTS

Figure 1:
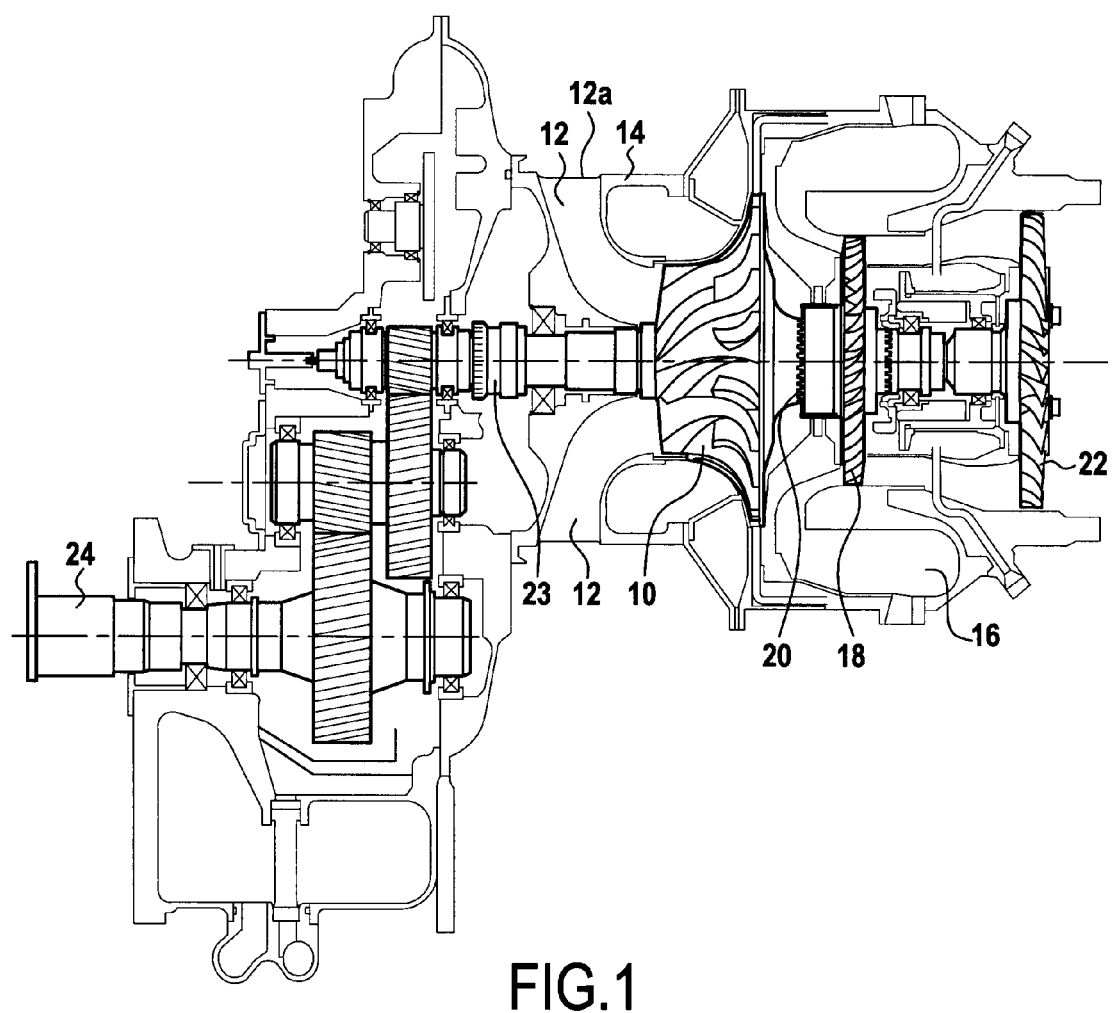
FIG. 1 is a very schematic view of a helicopter gas turbine engine.

FIG. 1 schematically shows a helicopter gas turbine engine comprising a compressor stage 10 (a centrifugal type of compressor, for example) receiving external air through an air supply annular passage 12. At its upstream end, the passage 12 opens through an annular outer opening 12a delimited by a metallic casing 14 of the engine. The casing 14 also defines the walls of passage 12. An annular combustion chamber 16, with, for example, a reverse flow system, is fitted with injectors (not shown) supplied with fuel and with a primary air flow from the compressor 10. The combustion gases from the chamber 16 drive a turbine 18 for driving the compressor 10—connected to the latter by a shaft 20—and a power turbine 22 (with one single stage, for example) connected by a shaft 23 to a gear train which supplies mechanical power to an output shaft 24, the shafts 20 and 23 being coaxial.

As FIG. 2 shows, two lips 30, 32 (not shown in FIG. 1) define an air intake 34 for the passage 12. The lips are formed by two respective annular parts which, at an inner end, connect with the upstream end of the passage 12 along and on each side of the opening 12a and, at their other—outer—end, have a rim 30a, 32a, bent outwards in a U-shape. At their inner end, the lips 30, 32 may have a ring or feet 30b, 32b with which they can be fastened to the case 14.

The end 34a of the air intake 34, defined by the rims 30a, 32a, is covered by an iceguard 36 with bent rims, the ends of which engage with the recesses of the rims 30a, 32a and are fastened to the latter. The guard 36 is intended to prevent the formation of frost in the air intake 34 and the supply passage 12, any icing occurring on the outer surface of the guard 36. An annular by-pass channel 38 is thus provided in order to supply sufficient air to the passage 12 in spite of icing of the guard 36. The channel 38 is defined on one side by a bent annular guidance wall 39 or plenum element, provided with stiffening ribs 39a and secured to the case 14. The wall 39 is situated facing an air intake lip, for example the lip 32, which defines the other side of the channel 38 and which has openings or ports 32c for the passing of the air coming from the channel 38. An air intake structure as described above is well known per se.

The wall of the lips 30, 32 forms a sound attenuator 40, 42 at least for part of the lips' radial dimension defining the air intake 34 from the connection to the supply passage 12, preferably for the entire radial dimension of the air intake 34, in order to attenuate the noise generated by the engine's nearest sound source, i.e. the compressor. Each sound attenuator can be formed from several adjacent parts if desirable for greater convenience in manufacture.

As is shown by the detail in FIG. 2, each sound attenuator, for example 40, can be formed by a set of adjacent cavities or cells 40a, separated by walls 40b, forming a honeycomb structure for example, the walls 40b running perpendicularly to the lip surface between a back 40c formed by a rigid plate or sheet which is sealed (not crossed by sound waves) and a front face 40d formed by a plate or sheet allowing sound waves to go through. The front plate or sheet 40d is, for example, perforated. A porous plate or sheet permeable to the sound waves to be attenuated could also be used.

The depth of the cavities 40a (the distance between the back and the front face) is chosen depending on the wavelength of the sound waves to be attenuated. The latter being produced essentially by the compressor 10, they have a frequency of the order of approximately 5 to 14 kHz for current helicopter gas turbine engines, which involves a cavity depth (a quarter of the wavelength) of approximately 0.6 cm to 1.6 cm. Housing the sound attenuator does not cause any bulkiness problems at the air intake lips. Advantageously, the wall of the lips 30, 32 bounding the air intake 34 is formed by the sound attenuator.

As the air intake 34 is situated in a "cold" area of the engine and does not constitute a structural part of the engine, the material of the lips 30, 32 fitted with or forming the sound attenuators 40, 42 can be chosen from a wide range of materials. In particular, the lips 30, 32 and sound attenuators 40, 42 can be made of a composite material with fibrous reinforcing, for example glass or carbon fibres and a resin matrix. As such a material is light, the presence of the sound attenuators is not penalizing in terms of mass.

The wall forming the plenum element 39 can be made of the same material as the lips 30, 32 and can also be fitted with or form a sound attenuator similar to the attenuators 30, 32.

Thus, effective attenuation of the noise generated by the compressor can be obtained simply, without problems generated by bulkiness and, without modification to the engine, including the air supply passage, so that the invention can easily be applied to existing engines.

However, it is possible, as is shown in FIG. 3, to provide sound attenuators 26, 28 also on the walls of the air supply passage 12, on part of its length from the connection with the air intake 34. The attenuators 26, 28 can have the same structure as the attenuators 40, 42 and can be made of the same metal material as the case 14 or a different material, for example, integrating a ceramic attenuator in the metal case.

In the foregoing, the making of sound attenuators in the form of Helmholtz attenuators has been considered. However, other sound attenuator structures can be used, foam or ceramic or metal porous materials, for example.

In the foregoing detailed description, the air intake lips 30, 32 extend along the annular outer opening 12a of the air supply passage 12 over the entire periphery of the engine. The invention is also applicable to the case where the outer opening of the air supply passage extend over a portion only of the periphery of the engine, the air intake lips with sound attenuator being located along the outer opening and being connected at their ends.

The invention claimed is:

1. Device for silencing a helicopter gas turbine engine, having a compressor (10) and a compressor air supply passage (12) opening at an upstream end through an outer opening (12a) delimited by a metallic casing (14) of the engine, the silencing device comprising air intake lips (30, 32) which define an air intake (34) for the compressor air supply passage, which have inner ends (30b, 32b) for connection to the metallic casing along the passage outer opening (12a) and which are at least partially formed by a sound attenuator (40, 42) calculated to attenuate sound frequencies produced by the compressor rotation.

2. Silencing device according to claim 1, in which the lips (30, 32) are made of a composite material with fibrous reinforcing densified by a resin.

3. Silencing device according to claim 1, in which the radial air intake (34) is provided with an iceguard (36) mounted on outer ends of the lips (30, 32).

4. Silencing device according to claim 1, also comprising a sound attenuator (26, 28) forming a wall of the compressor air supply passage (12) on a portion of the length of said passage starting from the outer opening (12a) thereof.

5. Helicopter gas turbine engine fitted with a silencing device according to any one of claims 1 to 4.

* * * * *